Patented May 10, 1938

2,116,893

UNITED STATES PATENT OFFICE 2,116,893

PROCESS OF CHLORINATING AND BROMINATING CARBONYL COMPOUNDS

Paul Heisel, Gersthofen, near Augsburg, Germany, assignor to I. G. Farbenindustrie Aktiengesellschaft, Frankfort-on-the-Main, Germany No Drawing. Application November 3, 1936, Serial No. 109,023. In Germany November 5, 1935

5 Claims. (Cl. 260—131)

The present invention relates to a process for halogenating and brominating carbonyl compounds.

In my co-pending patent application Serial #108,909 filed Nov. 2, 1936, there is described a new process of transforming hydrocarbons into their mono-halogen derivatives without a considerable formation of more highly halogenated by-products. The essential feature of the process consists in blowing through narrow tubes into the reaction chamber the halogen in direction opposite to that given to the vapor of the substance to be halogenated, care having to be taken that the monohalogenation product is eliminated from the halogenation zone by condensation at the moment where it is produced; it is thus withdrawn from the further action of the halogen.

Now I have found that this process is excellently suitable for introducing one halogen atom into carbonyl compounds having an alpha-position capable of being halogenated. During the halogenation of carbonyl compounds it has been necessary hitherto to produce simultaneously a relatively large quantity of more highly halogenated by-products; moreover molecular condensation of the carbonyl compounds often occurs under the influence of the hydrochloric acid formed, this being the cause of the further decrease of the yield. In order to prevent this latter drawback, carbonate of lime and water have been added to the carbonyl compound to be halogenated with the view of neutralizing the hydrogen chloride produced. This may avoid undesired molecular condensation but only at the cost of a very complicated further treatment and purification of required product. Moreover, the addition of calcium carbonate does not influence the quantity of the more highly halogenated by-products which are formed.

This invention diminishes both the molecular condensation and the quantity of by-products in one and the same operation. The substance to be halogenated is caused to pass in the vaporous condition through a column and enters, for instance, a vertical reaction chamber. Through a capillary the halogen is injected in a counter current to the vapor, halogenation occurring at once. The reaction chamber is kept at a temperature below the boiling point of the halogenated product, for instance at the boiling point of the substance to be halogenated, at which temperature the halogenation product of a higher boiling point is condensed and eliminated from the reaction zone by condensed vapor of the starting material. Under these conditions of the halogenation molecular condensation products are formed only to a very small extent because the hydrogen halide which is set free is at once boiled off. The injection of the halogen through a capillary in counter-current to the vapor of the starting material ascending in excess causes such a rapid and complete mixing of the two reacting bodies that only a small and tolerable quantity of the more highly halogenated by-product is formed.

For applying the invention the substance to be halogenated is, for instance, heated to boiling in a still. The vapor ascends through a column and enters the reaction chamber arranged vertically above the column. The halogen is blown in through fine capillaries in a counter-current to the ascending vapor. A complete mixing is produced and the halogenation sets in with a great speed. The reaction chamber is kept at the temperature of the vapor of the substance to be halogenated. The halogenation product is condensed and is washed into the column by the condensed vapor of the substance to be halogenated which is present in excess and returns as liquid from a reflux condenser mounted above the reaction chamber. The condensation product is thus withdrawn from the action of further quantities of halogen. The hydrogen halide is absorbed in a separate apparatus. The halogenation is interrupted when practically all the starting material has been halogenated and the starting material is separated from the halogenation product by distillation. This process may be performed in the apparatus described in my co-pending application of even date. The capillaries I prefer to use are likewise those described in the said co-pending application.

If necessary, the process may be performed with application of pressure or under reduced pressure and with or without the use of accelerating agents.

As starting materials there may, for instance be used: acetone, methyl-ethyl-ketone, diethyl-ketone, di-iso-propyl-ketone, phenyl-ethyl-ketone, cyclohexanone or methylcyclohexanone.

The following examples serve to illustrate the invention, but they are not intended to limit it thereto:

(1) 100 kilos of acetone are boiled in the apparatus described above. Into the reaction chamber chlorine is blown through capillaries in a counter current to the acetone vapor ascending. The chlorination product, monochloracetone, gradually accumulates in the boiling vessel. The chlorination is interrupted when 90 to 95 kilos of acetone have been chlorinated. The excess of acetone is then distilled and the monochloroacetone which remains and which contains 3–5 per cent. of dichloroacetone is purified by a vacuum distillation. If the chlorine is introduced into the reaction chamber, under otherwise the same conditions, through a tube which in comparison with the cross section of the reaction chamber can no longer be regarded as a capillary tube, the quantity of the dichloracetone contained in the crude chloracetone rises to about 15 per cent.

(2) 72 kilos of methylethyl ketone are boiled in a manner similar to that described in Example 1. Chlorine is blown into the reaction chamber through a capillary in a counter-current to the vapor ascending the chamber. The process is interrupted when about 90 per cent of the ketone has been chlorinated. The unaltered methyl-ethyl ketone is then distilled and the mixture of the chlorination products which remains is fractionated. 95 per cent of monochlorides are obtained, whereas the rest is more highly chlorinated. 26 per cent of the monochlorides consist of chloromethylethyl ketone, 74 per cent. consists of methyl-chloroethyl ketone.

(3) 12.0 kilos of acetophenon are subjected to a bromination in a manner similar to that described in Example 1; vapor of bromine is injected through a capillary in a counter-current to the ascending acetophenon vapor. As soon as 9 kilos have been brominated, the unaltered acetophenone is distilled under reduced pressure. The crude ω-bromacetophenon which remains constitutes a yield of 94 per cent. of the theoretical and contains about 5 per cent. of dibromacetophenon; it may be purified by recrystallization.

(4) Di-isopropyl ketone is boiled and the vapor is chlorinated in a manner similar to that described in Example 1 by injecting chlorine through a capillary in a counter-current to the vapor. When most of the ketone has been chlorinated the reaction is interrupted and when the unaltered di-isopropyl ketone has been eliminated, the crude chlorination product which remains is purified by distillation. 96 per cent. thereof consists of monochloro-di-isopropyl ketone boiling at 142° C. The remaining 4 per cent. consists for the most part of the dichlorinated product.

I claim:
1. The process of introducing a halogen of the group consisting of chlorine and bromine into ketones capable of being halogenated in alpha-position which comprises blowing halogen through a capillary counter-current to the vapors of the ketone at a temperature lower than the boiling point of the halogenation product.

2. The process of introducing one halogen atom of the group consisting of chlorine and bromine into ketones capable of being halogenated in alpha-position which comprises blowing halogen through a capillary counter-current to the vapors of the ketone at a temperature lower than the boiling point of the monohalogenation product.

3. The process of chlorinating acetone which comprises blowing chlorine through a capillary counter-current to the vapors of acetone at a temperature lower than the boiling point of the monochloracetone.

4. The process of chlorinating methyl-ethyl ketone which comprises blowing chlorine through a capillary counter-current to the vapors of methyl-ethyl ketone at a temperature lower than the boiling point of the alpha-chlorine derivatives of the methyl-ethyl-ketone.

5. The process of brominating acetophenone which comprises blowing bromine through a capillary counter-current to the vapors of acetophenone at a temperature lower than the boiling point of the ω-brom-acetophenone.

PAUL HEISEL.